May 21, 1929.  J. E. GRANGER  1,713,697

STABILIZING REACTANCE

Filed Aug. 11, 1927

Inventor:
Joseph E. Granger,
by: Bradbury & Caswell
Attorneys

Patented May 21, 1929.

1,713,697

UNITED STATES PATENT OFFICE.

JOSEPH E. GRANGER, OF ALHAMBRA, CALIFORNIA.

STABILIZING REACTANCE.

Application filed August 11, 1927. Serial No. 212,260.

My invention relates to an improved stabilizing reactance for electric arc welding and projecting apparatus and for other purposes. The primary object is the production of a device of the kind stated which is highly efficient and effective in operation, which is light in weight, which has small resistance loss, which is simple and inexpensive in construction and which permits of ready renewal of parts. A particular advantage of my invention is that the parts constituting the cores of the reactance coils may be easily renewed to overcome ageing effect and the parts so renewed used effectively as welding material, thus reducing cost of maintenance, permitting of more effective upkeep and conserving the use of welding material.

It is common knowledge that arc stability in electric arc welding apparatus and arc circuits for various purposes can be made more satisfactory by the use of a stabilizing reactance. This stabilizing reactance must be of such capacity as to enable the operator to strike the electrode on the work and withdraw it the proper distance before sticking of the electrode occurs, must efficiently choke current rushes when striking an arc, and must sustain the arc when made, thereby assisting the converter or generator to produce the uniformly hot arc necessary for good welding. These functions are fully accomplished by the use of my invention.

Figure 1:
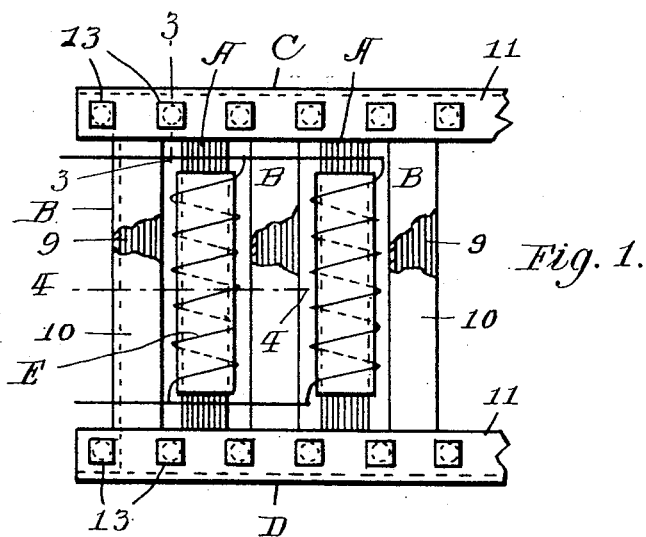
Figures 2, 3:
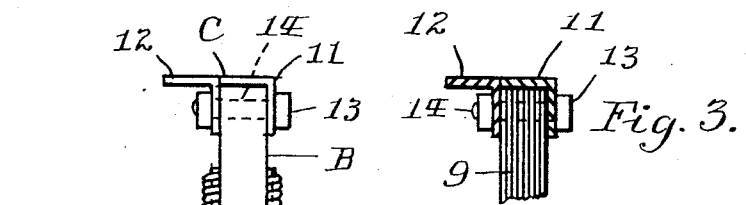
Figure 4:
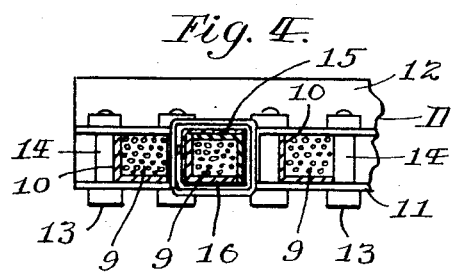

In the accompanying drawing forming part of this specification, Fig. 1 is a plan of my improved stabilizing reactance, it being understood that the multiplicity of cores and reactance coils may be increased or diminished as desired; Fig. 2 is an end view of the structure shown in Fig. 1; Fig. 3 is a section taken on the line 3—3 of Fig. 1, and Fig. 4 is a section taken on the line 4—4 of Fig. 1.

My improved stabilizing reactance is composed of a multiplicity of substantially straight magnetic cross bars A and B of equal length and arranged in spaced parallel relation, alternately in position. At the opposite ends of said cross bars are parallel magnetic end bars C and D which serve to hold the cross bars in place. Each cross bar has included in its structure a pack or bundle of welding rods 9 of magnetic material and of standard length or of any length and diameter desired and the rods of each cross bar B are assisted in being held in place by an angle iron 10 which is also held with the welding rods in the end bars. Each end bar is composed of a pair of angle irons 11 and 12 (see Fig. 2) removably clamped together over the ends of the cross bars by bolts 13, the shanks 14 of which serve to space the cross bars apart. Upon each cross bar constituting a core element A is mounted a reactance coil E with a pair of short angle irons 15 and 16 intervening between the coil and core. Each cross bar A and B being composed of a bundle of welding rods serves to laminate the structure and thus reduce resistance and excludes Faucault currents in the magnetic circuits which are set up in the core elements A and B. Proper insulation is employed between the reactance coils and the angle irons 15 and 16 on the core bars A. The entire device forms a rigid and unitary structure which can be unbolted and taken apart to replace the welding rods, which age, by new rods. Due to ageing effect of the material constituting the magnetic bars A and B it is desirable to renew these parts when it is found that their efficiency has decreased. The welding rods removed remain effective for use as welding material, whereas with structures of this kind formerly employed in which welding rods have not been used the ageing effect reduces efficiency and the parts so aged when removed are useless for any other purpose.

As many reactance coils may be employed as desired, the structure permitting an indefinite number being constructed into a single structure which is also an advantage. The method of connecting these coils may be in multiple or series or combinations of the two as desired. It is also feasible to mount a reactance coil upon every cross bar A and B instead of upon every other bar as shown, the proportions and resistance of the coils being varied as is well understood by those familiar with this art for the most advantageous results. For the purpose of defining the structure the magnetic cross bars may be termed cores for the coils in the magnetic circuits and the end bars yokes for holding as many of the core elements and reactance coils together as a unitary structure as desired.

In accordance with the patent statutes, I have described the principles of operation of my invention together with the apparatus which I consider to represent the best embodiment thereof but I desire to have it understood that the construction shown is only illustrative and that the invention can be carried out by other means and applied to uses other than those above set forth within the scope of the following claims.

Having described my invention what I claim as new and desire to secure by Letters Patent is:

1. A stabilizing reactance, comprising, in combination, a multiplicity of magnetic cores arranged at spaced intervals, each core consisting of a plurality of welding rods of magnetic material, yoke members holding the ends of said rods at spaced intervals and a series of reactance coils mounted upon said cores.

2. A stabilizing reactance, comprising, in combination, a multiplicity of magnet cores in parallel relation at spaced intervals, each core consisting of a bundle of welding rods of magnetic material, reactance coils mounted upon said bundle of rods, and means at the opposite ends of said cores for detachably holding the cores in spaced relation as a unit.

3. A stabilizing reactance, having a series of magnetic cores spaced apart, reactance coils on said cores and a yoke member separably holding each series of ends of said cores in spaced position, each of said cores consisting of a pack of welding rods of magnetic material and each yoke member consisting of a pair of bars embracing the ends of the cores and bolts clamping the bars on the cores and spacing the cores at regular intervals.

In witness whereof I have signed my name to this specification.

JOSEPH E. GRANGER.